(12) United States Patent
Lei et al.

(10) Patent No.: US 11,909,527 B2
(45) Date of Patent: Feb. 20, 2024

(54) CBG-BASED RETRANSMISSION

(71) Applicant: LENOVO (BEIJING) LIMITED, Beijing (CN)

(72) Inventors: Haipeng Lei, Beijing (CN); Zhi Yan, Beijing (CN); Xiaodong Yu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 478 days.

(21) Appl. No.: 17/261,386

(22) PCT Filed: Jul. 23, 2018

(86) PCT No.: PCT/CN2018/096666
§ 371 (c)(1),
(2) Date: Jan. 19, 2021

(87) PCT Pub. No.: WO2020/019118
PCT Pub. Date: Jan. 30, 2020

(65) Prior Publication Data
US 2021/0266105 A1    Aug. 26, 2021

(51) Int. Cl.
*H04L 1/1607*    (2023.01)
*H04W 28/04*    (2009.01)
*H04W 72/23*    (2023.01)

(52) U.S. Cl.
CPC .......... *H04L 1/1607* (2013.01); *H04W 28/04* (2013.01); *H04W 72/23* (2023.01)

(58) Field of Classification Search
None
See application file for complete search history.

(56) References Cited

U.S. PATENT DOCUMENTS

| 11,246,117 B2* | 2/2022 | Ying | H04W 72/04 |
| 2011/0075684 A1* | 3/2011 | Zeng | H04L 1/1861 |
| | | | 370/475 |
| 2017/0207895 A1 | 7/2017 | Yang et al. | |

(Continued)

FOREIGN PATENT DOCUMENTS

| CN | 108289015 A | 7/2018 |
| WO | 2016117929 A1 | 7/2016 |

(Continued)

OTHER PUBLICATIONS

Lenovo, Motorola Mobility, "CBG construction for CBG-based retransmission", R1-1707769, Lenovo, Motorola Mobility, 3GPP TSG RAN WG1 Meeting #89, May 15-19, 2017, pp. 1-4.

(Continued)

*Primary Examiner* — Clemence S Han
(74) *Attorney, Agent, or Firm* — Kunzler Bean & Adamson

(57) ABSTRACT

Apparatus and method for CBG-based retransmission are disclosed. An apparatus comprising: a receiver that receives a first number of TBs, wherein each TB includes a second number of code block groups (CBGs); a processor that decodes the first number of TBs; and a transmitter that transmits a signaling comprising a first field corresponding to the first number of TBs and a second field corresponding to the CBGs included in a third number of TBs, wherein the third number of TB s are the incorrectly decoded TBs in the first number of TBs.

19 Claims, 4 Drawing Sheets

(56) References Cited

U.S. PATENT DOCUMENTS

| | | | |
|---|---|---|---|
| 2019/0074929 A1* | 3/2019 | Aiba | H04L 1/0025 |
| 2019/0150122 A1* | 5/2019 | Ying | H04W 72/23 370/329 |
| 2019/0207734 A1* | 7/2019 | Yang | H04L 1/1864 |
| 2019/0327759 A1* | 10/2019 | Lee | H04W 72/1268 |
| 2019/0349965 A1* | 11/2019 | Chakraborty | H04W 16/14 |
| 2019/0372720 A1* | 12/2019 | Lee | H04W 72/23 |
| 2020/0059327 A1* | 2/2020 | Kini | H04L 1/1812 |
| 2020/0100139 A1* | 3/2020 | Kim | H04L 1/1861 |
| 2020/0374040 A1* | 11/2020 | Lou | H04L 1/1614 |
| 2020/0374045 A1* | 11/2020 | Yin | H04L 1/1854 |
| 2021/0167894 A1* | 6/2021 | Park | H04L 5/0053 |

FOREIGN PATENT DOCUMENTS

| | | |
|---|---|---|
| WO | 2018053854 A1 | 3/2018 |
| WO | 2019099469 A1 | 5/2019 |

OTHER PUBLICATIONS

LG Electronics, "Considerations on HARQ process and feedback for NR", R1-1717966, 3GPP TSG RAN WG1 Meeting #90bis, Oct. 9-13, 2017, pp. 1-14.

Sequans, "HARQ codebook for carrier aggregation", R1-1800797, 3GPP TSG RAN WG1 Meeting AH 1801, Jan. 22-26, 2018, pp. 1-2.

OPPO, "Remaining issues on HARQ-ACK transmission", R1-1800493, 3GPP TSG RAN WG1 Meeting AH 1801, Jan. 22-26, 2018, pp. 1-3.

Lenovo, "CBG construction for CBG-based retransmission", R1-1707769, Lenovo, Motorola Mobility, 3GPP TSG RAN WG1 Meeting #89, May 15-19, 2017, pp. 1-4.

Lenovo, "UL HARQ-ACK feedback for CBG-based retransmission", R1-1710604, Lenovo, Motorola Mobility, 3GPP TSG RAN WG1 NR Ad-Hoc#2, Jun. 27-30, 2017, pp. 1-5.

PCT/CN2018/096666, "International Search Report and the Written Opinion of the International Search Authority" ISA/CN, National Intellectual Property Administration, Office of the PRC China, dated Mar. 13, 2019, pp. 1-6.

* cited by examiner

CBG-BASED RETRANSMISSION

FIELD

The subject matter disclosed herein generally relates to wireless communications, and more particularly relates to CBG-based retransmission.

BACKGROUND

The following abbreviations are herewith defined, some of which are referred to within the following description: Third Generation Partnership Project (3GPP), Cyclic Redundancy Check (CRC), Downlink (DL), Evolved Node B (eNB), European Telecommunications Standards Institute (ETSI), Enhanced Interference Management and Traffic Adaptation (eIMTA), Frequency Division Duplex (FDD), Frequency Division Multiple Access (FDMA), Hybrid Automatic Repeat Request Acknowledgement (HARQ-ACK), Long Term Evolution (LTE), Multiple Access (MA), Next Generation Node B (gNB), New Radio (NR), Negative Acknowledgement (NACK), Orthogonal Frequency Division Multiplexing (OFDM), Physical Resource Block (PRB), Physical Downlink Shared Channel (PDSCH), Physical Uplink Control Channel (PUCCH), Physical Uplink Shared Channel (PUSCH), Positive Acknowledgement (ACK), Radio Resource Control (RRC), Reference Signal (RS), Single Carrier Frequency Division Multiple Access (SC-FDMA), System Information (SI), Signal to Interference plus Noise Ratio (SINR), Transport Block (TB), Time-Division Duplex (TDD), Time Division Multiplex (TDM), User Entity/Equipment (Mobile Terminal) (UE), Uplink (UL), Uplink Control Information (UCI), Universal Mobile Telecommunications System (UMTS), Ultra Reliable & Low Latency Communication (URLLC) and Worldwide Interoperability for Microwave Access (WiMAX), Downlink Control Information (DCI), Code Block (CB), Code Block Group (CBG), Downlink Assignment Index (DAI), CBG transmission information (CBGTI), New Data Indicator (NDI), Downlink Association Set (DAS).

In 3GPP 5G new radio (NR), the downlink (DL) transport blocks (TBs) are carried on the Physical Downlink Shared Channel (PDSCH) from a gNB to a UE. HARQ-ACK (hybrid automatic repeat request acknowledgement) represents the Positive Acknowledgement (ACK) and the Negative Acknowledgement (NACK) collectively. ACK means that a TB is correctly received at the UE while NACK means a TB is erroneously received at the UE. The HARQ-ACK feedback bits corresponding to the PDSCH (or corresponding to the TB) are transmitted either on the Physical Uplink Control Channel (PUCCH) or on the Physical Uplink Shared Channel (PUSCH) from the UE to the gNB.

For TB-based retransmission, one HARQ-ACK feedback bit corresponds to one TB. As long as one CB (code block) of a given TB is not correctly decoded at the receiver side, the whole TB would be reported to a NACK causing the transmitter to retransmit all the CBs of the TB. On the other hand, if one HARQ-ACK feedback bit corresponds to one CB, the gNB could know the decoding state of each transmitted CB and only retransmit the failed CBs. In this way, retransmission efficiency is the highest. However, the HARQ-ACK feedback overhead would be huge.

In order to balance the number of the HARQ-ACK feedback bits and the retransmission efficiency, the concept of CBG (code block group) is introduced. The intention of CBG is to group several code blocks into one code block group. As a result, the HARQ-ACK feedback is generated per CBG. Only if all the code blocks within one CBG are correctly decoded, the HARQ-ACK for the CBG can be set to ACK; otherwise, it is set to NACK. Upon the reception of the HARQ-ACK feedback, only the CBG(s) with NACK(s) shall be retransmitted.

However, in the CBG-based retransmission, the payload size is still large.

In NR, the CBG-based transmission is supported in both PDSCH and PUSCH.

For PDSCH, the payload size for HARQ-ACK feedback corresponding to multiple PDSCHs is large.

For semi-static HARQ-ACK codebook determination, within a given DL association set, candidate PDSCH occasions are determined based on the factors below:

Set of K1;
PDSCH symbol allocation table in a time domain;
Semi-static UL/DL configuration.

As a result, a semi-static HARQ-ACK codebook is determined based on the following factors:

Number of valid slots within each downlink association set;
Number of TBs for one PDSCH;
Number of configured DL carriers;
Max number of non-overlapped PDSCH occasions per slot per cell;
Max number of CBGs per TB.

Based on the above factors, semi-static HARQ-ACK codebook determination leads to a relatively large HARQ-ACK codebook. In some cases, the HARQ-ACK codebook may be huge.

For example, if N PDSCH occasions are determined in the downlink association set and C carriers are configured, semi-static HARQ-ACK codebook size would be C*N*M, where M is the RRC configured to the maximum number of CBGs of one TB. If N=4, C=5 and M=8, 160 HARQ-ACK bits are generated. It can be observed that a semi-static HARQ-ACK codebook would cause too much overhead in UCI and need more uplink resources for the PUCCH transmission.

Dynamic HARQ-ACK codebook determination can bring less HARQ-ACK overhead. For example, for a UE, if X PDSCHs on multiple carriers are determined based on the total DAI, dynamic HARQ-ACK codebook size is X*M, where M is the RRC configured maximum number of CBGs of one TB. If X=10 and M=8, 80 HARQ-ACK bits are generated. The problem for dynamic codebook size determination is how to synchronize the understanding between gNB and UE when some PDCCH(s) for scheduling PDSCH(s) are missed. With the help of counter DAI and total DAI, UE would know which PDSCH is missed. As mentioned above, the number of HARQ-ACK bits for one TB is still equal to the configured maximum number of CBGs per TB in case of dynamic HARQ-ACK codebook determination. Hence, dynamic HARQ-ACK codebooks may still cause large payload size with CBG-based retransmission.

For PUSCH, the payload size for HARQ-ACK feedback corresponding to multiple PUSCHs is also large.

For CBG-based PUSCH retransmission, a bitmap of CBGTI (CBG transmission information) is included in a UL grant indicating which CBG(s) needs to be retransmitted. Upon the reception of CBGTI in the UL grant, UE shall retransmit the corresponding CBG(s). In the event one PUSCH is scheduled by one UL grant (DCI format), the length of the CBGTI is equal to the RRC configured maximum number of CBGs per TB.

A large payload size of CBGTI may be caused when a single UL grant schedules multiple PUSCHs. E.g., when a single UL grant schedules up to 4 PUSCHs and the RRC configured maximum number of CBGs per TB is 8, the CBGTI field in the UL grant would occupy 4*8=32 bits. Even if the RRC configured maximum number of CBGs per TB is set to 4, the CBGTI field still needs 4*4=16 bits. With the consideration of other necessary information fields, the final payload size of DCI format 0_1 would be huge.

Based on the above analysis, for CBG-based retransmission, HARQ-ACK compression for both DL and UL is needed.

For DL, a small payload of HARQ-ACK feedback would be more reliable and need less PUCCH resources.

For UL, a single UL grant ensures a small CBGTI field for multiple PUSCHs scheduled by the UL grant.

BRIEF SUMMARY

Apparatuses and methods for CBG-based retransmission are disclosed.

In one embodiment, an apparatus comprising: a receiver that receives a first number of TBs, wherein each TB includes a second number of code block groups (CBGs); a processor that decodes the first number of TBs; and a transmitter that transmits a signaling comprising a first field corresponding to the first number of TBs and a second field corresponding to the CBGs included in a third number of TBs, wherein the third number of TBs are the incorrectly decoded TBs in the first number of TBs.

In one embodiment, the apparatus may be a base unit, e.g., a gNB. Alternatively, the apparatus may be a remote unit, e.g., a UE.

In some embodiment, the first field includes the first number of bits indicating the decoding results of the first number of TBs, and the decoding result corresponding to a TB is an ACKNOWLEDGEMENT (ACK) in response to the TB being correctly decoded or a NEGTIVE ACKNOWLEDGEMENT (NACK) in response to the TB being incorrectly decoded.

In some embodiment, the second field includes the second number of bits indicating the decoding results of the CBGs included in the third number of TBs, and the decoding result corresponding to a CBG is an ACKNOWLEDGEMENT (ACK) in response to all of CBs of the CBG being correctly decoded or a NEGTIVE ACKNOWLEDGEMENT (NACK) in response to at least one CB of the CBG being incorrectly decoded.

In some embodiment, the second field includes the second number of bits, and each bit corresponds to a set of CBGs with the same CBG index included in the third number of TBs, for indicating ACK in response to the set of CBGs being correctly decoded or NACK in response to at least one CBG of the set of CBGs being incorrectly decoded. In particular, each bit of the second field is generated by performing a logic operation among the set of CBGs with the same CBG index. The logic operation may be logic AND in the condition that '1' represents ACK and '0' represents NACK. Alternatively, the logic operation may be logic OR in the condition that '1' represents NACK and '0' represents ACK.

In some embodiment, the first number of TBs is scheduled by a single DCI format, and the first number is indicated by the DCI format.

In some embodiment, the maximum number of TBs scheduled by a single DCI format is configured by RRC signaling. In addition, the DCI format includes a field indicating the first number, and the length of the field is determined based on the configured maximum number of TBs scheduled by a single DCI format.

In some embodiment, the first field includes the first number of bits, and each bit indicates whether one of the first number of TBs is to be retransmitted.

In some embodiment, the first field includes the first number of New Data Indicator (NDI) bits, and each NDI bit corresponds to one of the first number of TBs.

In some embodiment, the length of the first field equals to a maximum number of TBs scheduled by a single DCI format.

In some embodiment, the second field includes the second number of bits, and each bit corresponds to a set of CBGs with same CBG index included in the third number of TBs for indicating whether the set of CBGs is to be retransmitted.

In some embodiment, the second number is configured by RRC signaling.

In another embodiment, a method comprising: receiving a first number of TBs, wherein each TB includes a second number of code block groups (CBGs); decoding the first number of TBs; and transmitting a signaling comprising a first field corresponding to the first number of TBs and a second field corresponding to the CBGs included in a third number of TBs, wherein the third number of TBs are the incorrectly decoded TBs in the first number of TBs.

BRIEF DESCRIPTION OF THE DRAWINGS

A more detailed description of the embodiments briefly described above will be specified and illustrated in the appended drawings. With the caveat that these drawings depict only some embodiments, and should not therefore limit their scope, the embodiments will be described and explained with additional specificity and detail through the use of the accompanying drawings, in which.

DETAILED DESCRIPTION

Figure 1:
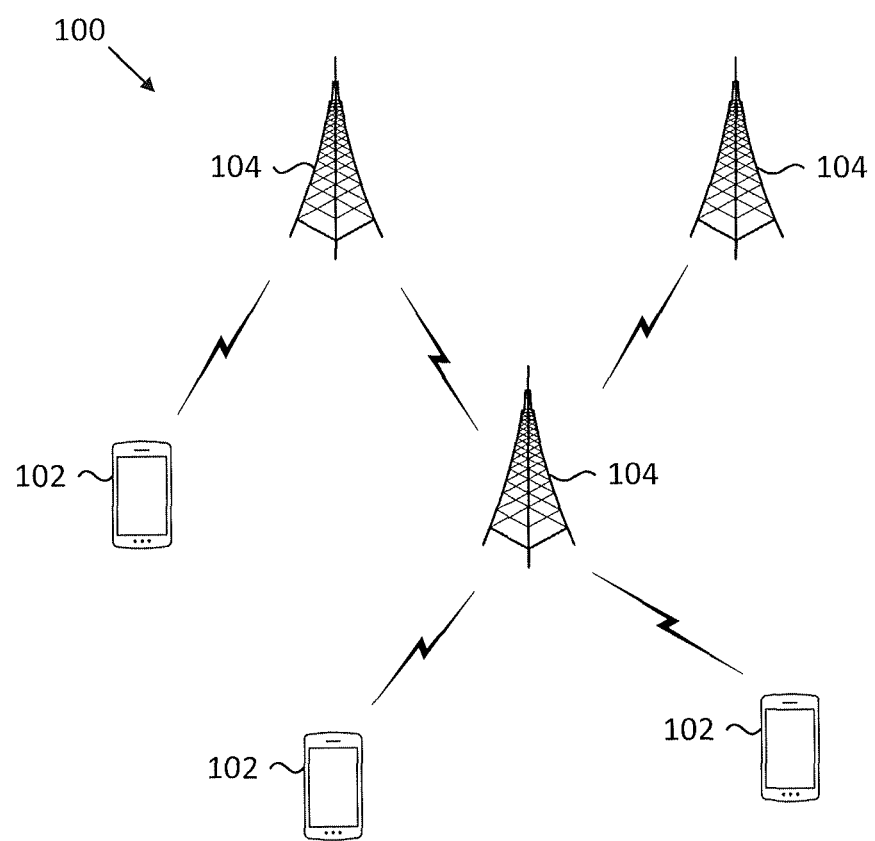
FIG. 1 is a schematic block diagram illustrating one embodiment of a wireless communication system for retransmitting uplink control information.

As those familiar in the field will be aware, aspects of the embodiments may be embodied as a system, apparatus, method, or program product. Accordingly, embodiments may be comprised entirely of hardware, entirely of software (including firmware, resident software, micro-code, etc.) or a hybrid that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or similar.

Modules may also be implemented in code and/or software for execution by various types of processors. An identified module of code may, for instance, include one or more physical or logical blocks of executable code which may be organized as an object, procedure, or function. Nevertheless, the executables of an identified module need not be physically located together, but may include disparate instructions stored in different locations which, when joined logically together, include the module and achieve the stated purpose for the module.

A module of code may be a single or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory ("RAM"), read-only memory ("ROM"), erasable programmable read-only memory ("EPROM" or "Flash Memory"), portable compact disc read-only memory ("CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or similar, and conventional procedural programming languages, such as the "C" programming language or similar, and/or machine languages such as assembly languages. The code may be executed entirely or partly on the user's computer, as a stand-alone software package, partly on the user's computer and partly on a remote computer or entirely on the remote computer or server. In the very last scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. Experts will recognize, however, that embodiments may be practiced without one or more of the specific details, or with other methods, components, materials, and so forth. In other instances, well-known structures, materials, or operations are not shown or described in detail to avoid obscuring any aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for CBG-based retransmission. In one embodiment, the wireless communication system 100 includes remote units 102 and base units 104. Even though a specific number of remote units 102 and base units 104 are depicted in FIG. 1, it should be noted that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, UE, user terminals, a device, or by other terminology used in the field. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the field. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the field.

In one implementation, the wireless communication system 100 is compliant with the 3GPP 5G new radio (NR). More generally, however, the wireless communication system 100 may implement some other open or proprietary communication protocol, for example, WiMAX, among other protocols.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

Figure 2:
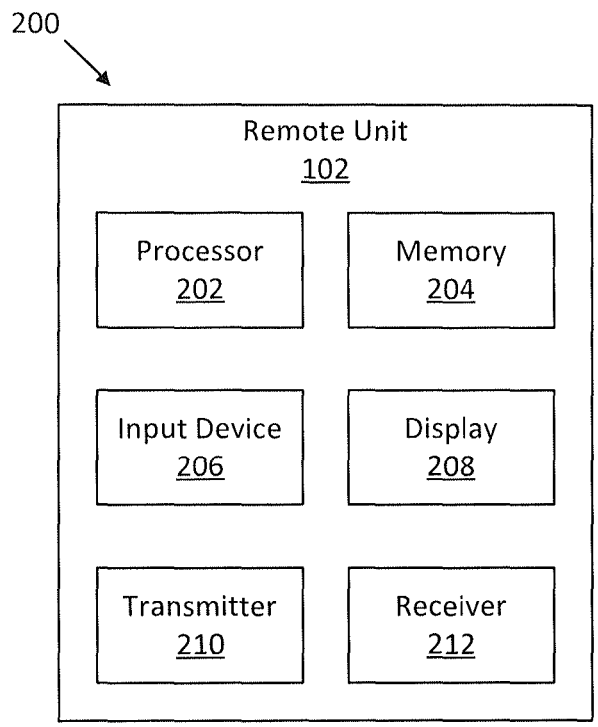
FIG. 2 is a schematic block diagram illustrating one embodiment of an apparatus that may be used for retransmitting uplink control information.

FIG. 2 depicts one embodiment of an apparatus 200 that may be used for CBG-based retransmission. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive the broadcast signal. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
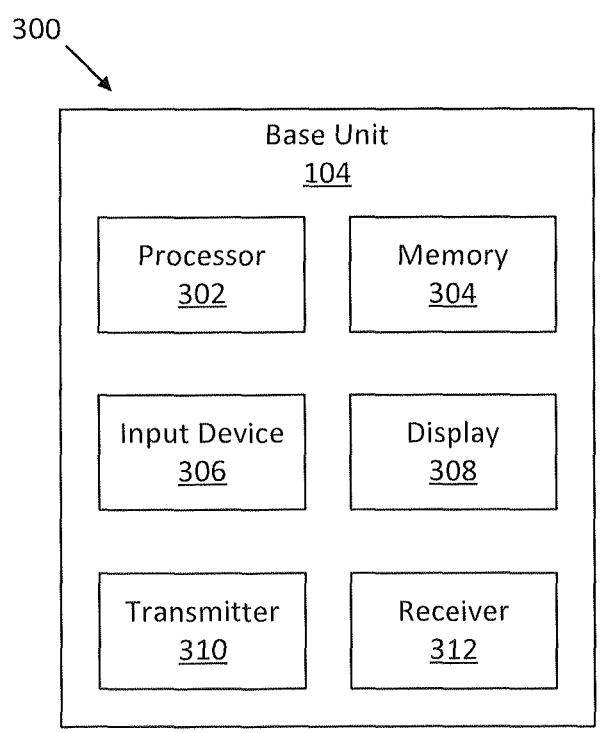
FIG. 3 is a schematic block diagram illustrating one embodiment of an apparatus that may be used for retransmitting uplink control information.

FIG. 3 depicts one embodiment of an apparatus 300 that may be used for CBG-based retransmission. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit signaling to the remote unit. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
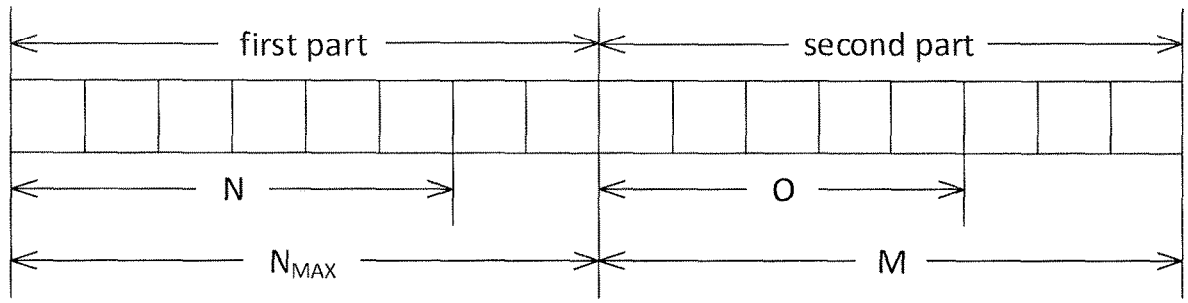
FIG. 4 is a schematic diagram illustrating one embodiment of CBGTI.

FIG. 4 shows an example of a CBGTI field. The CBGTI field contains two parts. The first part of the CBGTI field contains $N_{MAX}$ bits; while the second part of the CBGTI field contains M bits. The total length of the CBGTI field is $N_{MAX}+M$ bits, in which $N_{MAX}$ indicates the configured maximum number of PUSCHs scheduled by a single UL grant and M is the RRC configured maximum number of CBGs of one TB. As well-known in the art, the UL grant is also referred to as DCI format.

For UL transmissions, the UE may transmit TBs in multiple PUSCHs in a single transmission. For ease of discussion, it is assumed that one PUSCH carries only one TB. The maximum number '$N_{MAX}$' of PUSCHs that may be scheduled is preconfigured by the gNB via RRC signaling. Based on the preconfigured maximum number of PUSCHs ($N_{MAX}$), the UE may determine the payload size of the UL grant and perform blind detection in the search space.

The $N_{MAX}$ is preferably larger than or equal to 2 and smaller than or equal to 8. More preferably, the possible values of $N_{MAX}$ are 2, 4, 6, 8.

To differentiate the UL grant scheduling multiple PUSCHs ($N_{MAX}>1$) to the UL grant scheduling single PUSCH ($N_{MAX}=1$), a different payload size for the two kinds of UL grants should be guaranteed by means of padding Z zero bits to the UL grant scheduling multiple PUSCHs. In one embodiment, the value of Z is fixed to 2.

For multiple PUSCHs, it is apparent that the minimum value of $N_{MAX}$ should be larger than or equal to 2.

Carrier Aggregation (CA) with different numerologies on different carriers has been supported, wherein one carrier with 15 KHz subcarrier spacing may schedule another carrier with 120 KHz subcarrier spacing. Considering the slot duration using 15 KHz subcarrier spacing is equal to 8 slots using 120 KHz subcarrier spacing, a single UL grant would schedule the maximum 8 PUSCHs to align the subframe boundary. This is especially useful when one carrier in a low frequency band with 15 KHz subcarrier spacing schedules another carrier in a high frequency band (e.g., 60 GHz in millimeter wave band) with 120 KHz subcarrier spacing. In view of the above, the preferable maximum value of $N_{MAX}$ is 8.

The gNB does not always schedule the maximum number of PUSCHs in a single UL grant. Instead, N is denoted as the actual number of PUSCHs scheduled by a single UL grant. N may be equal to or smaller than $N_{MAX}$.

Three bits in the UL grant are used to explicitly indicate the value of N if RRC signaling configures $N_{MAX}$ is 8 or 6. Two bits in the UL grant are used to explicitly indicate the value of N if RRC signaling configures $N_{MAX}$ is 4. One bit in the UL grant is used to explicitly indicate the value of N if RRC signaling configures $N_{MAX}$ is 2. As the UE is preconfigured with $N_{MAX}$, the UE would know that one, two, or three bits are contained in the UL grant to indicate the value of N.

The first part of the CBGTI field consisting of $N_{MAX}$ bits is for the purpose of TB-level transmission indication. That is, each bit represents a HARQ-ACK feedback for one TB. If one TB is successfully received (correctly decoded), the corresponding HARQ-ACK bit would be ACK. If one TB is erroneously received (incorrectly decoded), the corresponding HARQ-ACK bit would be NACK.

In the condition of $N<N_{MAX}$, only N bits are enough to represent TB-based HARQ-ACK feedback. The remaining ($N_{MAX}-N$) bit(s) in the first part of the CBGTI field may be reserved. Preferably, the ($N_{MAX}$–N) LSB or MSB bit(s) of the first part are reserved. The reserved ($N_{MAX}$–N) bit(s) may be set as ACK bit(s) or NACK bit(s).

The second part of the CBGTI consisting of M bits is for the purpose of CBG-level transmission indication for the failed PUSCH(s). As described earlier, M is the RRC configured maximum number of CBGs per TB. In the condition that one TB is erroneously received, at least one CBG of that TB is erroneously received.

Suppose K represents the number of TBs that are erroneously received at the gNB, K may be 0, 1, 2, . . . N.

In the condition that K=0, all TBs are successfully received. Therefore, there is no failed PUSCH (or erroneously received TB). In this condition, M bits in the second part may be padded by M ACK bits. Alternatively, the M bits of the second part may be reserved so long as the same understanding on the reserved bits between the UE and the gNB is guaranteed.

In the condition that K=1, only one TB is erroneously received. Therefore, the M bits of the second part represent HARQ-ACK feedbacks for the M CBGs contained in the erroneously received TB. If one CBG is successfully received, the corresponding HARQ-ACK bit would be ACK. If one CBG is erroneously received, the corresponding HARQ-ACK bit would be NACK. As a result, in the condition that CBG(s) of only one TB is erroneously received at the gNB (the CBGs of other TBs are successfully received), the first part of the CBGTI field would indicate which TB is erroneously received (only the bit for the PUSCH corresponding to the erroneously received TB is set to NACK, while the bits for the PUSCHs corresponding to the successfully received TBs are set to ACKs). The second part of the CBGTI field would indicate which CBG(s) of the erroneously received TB is/are erroneously received (only the bit(s) corresponding to the erroneously received CBG(s) are set to NACK, while the bit(s) corresponding to the successfully received CBG(s) are set to ACK).

In the condition that K=2 . . . N, at least two (up to N) TBs are erroneously received at the gNB. In this condition, each bit in the second part is generated by performing a logic operation on all of the corresponding CBGs of the K erroneously received PUSCH(s). In particular, the first bit in the second part is generated by performing a logic operation on all the first CBGs ($CBG_0$s) of the K erroneously received PUSCHs; the second bit in the second part is generated by performing a logic operation on all the second CBGs ($CBG_1$s) of the K erroneously received PUSCHs; . . . the $M^{th}$ bit in the second part is generated by performing a logic operation on all the $M^{th}$ CBGs ($CBG_{M-1}$s) of the K erroneously received PUSCHs. The logic operation is performed so that as long as one corresponding bit of any of the K erroneously received PUSCHs is NACK, the resulting bit is NACK. Needless to say, if all of the corresponding bits of all of the K erroneously received PUSCHs are ACKs, the resulting bit is ACK. If '1' represents ACK and '0' represents NACK, the logic operation may be "AND" (logic AND). If '0' represents ACK and '1' represents NACK, the logic operation may be "OR" (logic OR).

An example is described assuming K=2, which means that two TBs are erroneously received at the gNB. Suppose '1' represents ACK and '0' represents NACK, the logic operation would be "AND" (logic AND). As an example, suppose that the first erroneously received TB contains 8 CBGs (M=8) and the second and fourth CBGs of the first erroneously received TB are erroneously received (the other six CBGs of the first erroneously received TB are successfully received), the resulting CBGs of the first erroneously received TB may be represented as "10101111". In addition, suppose that the third and fourth CBGs of the second erroneously received TB are erroneously received, the resulting CBGs of the second erroneously received TB may be represented as "11001111". The "AND" logic operation is performed on each corresponding bit of the first and second TBs. In particular, '1' AND '1'='1', '1' AND '0'='0', '0' AND '0'='0'. Therefore, "10101111" AND "11001111"="10001111". That is, the resulting second part of the CBGTI field would be "10001111", which means that the second, the third and fourth CBGs of the K (K=2 in this example) erroneously received TBs may be erroneously received CBGs and would be retransmitted.

As described above, M is the RRC configured maximum number of CBGs of one TB. Instead of M CBGs contained in a TB, it is possible that only O (O<M) numbers of CBGs are actually contained in the TB. This is caused by the situation that only O CBs are contained in the TB. Even if one CBG is composed of one CB, there would be only O CBG(s) contained in the TB. Consequently, the number of code block groups (CBGs) of the TB may be smaller than the maximum number M. In this condition, only O bits in the second part of the CBGTI would be used to indicate the erroneously received CBG(s) of the erroneously received TB(s). On the other hand, the remaining (M-O) bit(s) of the second part may be reserved. Preferably, the (M-O) LSB or MSB bit(s) of the second part are reserved. Preferably, the reserved (M-O) bit(s) may be padded with ACK bit(s).

In the above example, '1' represents ACK and '0' represents NACK, and the logic operation is "AND" (logic AND). Alternatively, if '0' represents ACK and '1' represents NACK, the logic operation may be "OR" (logic OR). Similar to the above example, suppose that the first erroneously received TB contains 8 CBGs (M=8) and the second and fourth CBGs of the first erroneously received TB are erroneously received (the other six CBGs are successfully received), the resulting CBGs of the first TB may be represented as "01010000". In addition, suppose that the third and fourth CBGs of the second erroneously received TB are erroneously received, the resulting CBGs of the second erroneously received TB may be represented as "00110000". In particular, '0' OR '0'='0', '1' OR '0'='1', '1' OR '1'='1'. Therefore, "01010000" OR "00110000"="01110000". That is, the resulting second part of the CBGTI field would be "01110000", which means that the second, the third and fourth CBGs of the K (K=2 in this example) erroneously received TBs may be erroneously received CBGs and would be retransmitted.

Incidentally, the CBGTI field is newly introduced to indicate the CBGs that are necessary to be retransmitted. In this condition, the traditional NDI (New Data Indicator) bit may not be included in the UL grant. Alternatively, the NDI bit may be used for carrying the first part of the CBGTI field.

Figure 5:
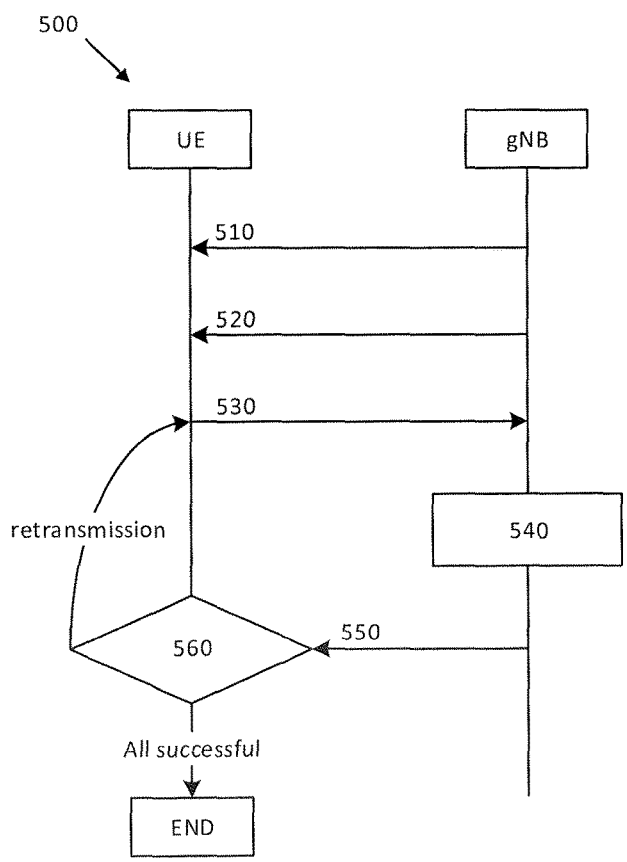
FIG. 5 is a schematic flow chart diagram illustrating an embodiment of a method for transmitting CBGTI.

FIG. 5 depicts a method (500) for transmitting CBGTI.

In step 510, the maximum number '$N_{MAX}$' of PUSCHs scheduled by a single UL grant and the maximum number 'M' of CBGs per TB are pre-configured using RRC signaling. The value of '$N_{MAX}$' and the value of 'M' are transmitted to the UE. The preferable range of $N_{MAX}$ is 2 to 8. More preferably, the values of $N_{MAX}$ may be 2, 4, 6 or 8. Upon receiving the value of $N_{MAX}$, the UE may perform blind detection in search space.

In step 520, the gNB schedules a first UL grant to the UE to initiate UL transmissions. The first UL grant schedules the actual number 'N' of PUSCHs that the UE would transmit. N may be equal to or smaller than $N_{MAX}$. In the condition that $N_{MAX}$=6 or 8, the UE knows that three bits in the first UL grant would explicitly indicate the value of N. In the condition that $N_{MAX}=4$, the UE knows that two bits in the first UL grant would explicitly indicate the value of N. In the condition that $N_{MAX}=2$, the UE knows that one bit in the first UL grant would explicitly indicate the value of N.

In step 530, upon detecting the first UL grant, the UE transmits TBs on N PUSCHs to the gNB. For ease of discussion, one TB is transmitted on one PUSCH. Each TB includes M CBGs. In the condition that only a number 'O' CBs of a TB are necessary to be transmitted and 'O' is smaller than M, each CB of the O CBs (O<M) would compose a CBG. Therefore, the TB would include O CBGs.

In step 540, the gNB receives and decodes all of the N TBs transmitted from the UE. The decoding result indicates whether each TB and each CBG of the TBs are correctly decoded (which means successfully received) or incorrectly decoded (which means erroneously received). In particular, a TB being successfully received means that all of the CBGs of the TB are successfully received. On the other hand, so long as at least one CBG of a TB is erroneously received, the TB is erroneously received although other CBG(s) of the TB are successfully received. Incidentally, when at least one CB of a CBG is erroneously received, the CBG is said to be erroneously received.

The gNB generates the first part and the second part of the CBGTI field according to the decoding result.

As shown in FIG. 4, the first part of the CBGTI field contains $N_{MAX}$ bits. If $N_{MAX}$ ($N=N_{MAX}$) TBs are received at the gNB, each bit of the first part indicates whether each of the $N_{MAX}$ TBs is successfully or erroneously received. In the condition that N ($N<N_{MAX}$) TBs are received at the gNB, N bits of the first part indicates whether the N TBs are successfully or erroneously received, and the remaining ($N_{MAX}-N$) bits are reserved (that may be set either as ACK or NACK). Preferably, the remaining ($N_{MAX}-N$) LSB or MSB bits of the first part are reserved and padded with ACK.

As shown in FIG. 4, the second part of the CBGTI field contains M bits. K represents the number of TBs that are erroneously received at the gNB, K may be 0, 1, 2, . . . N. Each bit in the second part is generated by performing a logic operation on all of the corresponding CBGs of the K erroneously received PUSCH(s). The logic operation may be logic AND in the condition that '1' represents ACK and '0' represents NACK. Alternatively, the logic operation may be logic OR in the condition that '0' represents ACK and '1' represents NACK.

In the condition that K=0, which means that no TB is erroneously received (i.e., all of TBs are successfully received), all of the M bits of the second part may be reserved. Preferably, all of the M bits are set to ACK.

In the condition that K=1, meaning that only one TB is erroneously received, the logic operation is unnecessary. Each of the M bits indicates whether the corresponding CBG of the erroneously received TB is successfully or erroneously received.

In the condition that K=2 to N, it means that at least two TBs are erroneously received, so the logic operation is necessary. Each bit in the second part is generated by performing a logic operation on all of the corresponding CBGs of the K erroneously received PUSCH(s), so that as long as one corresponding bit of any of the K erroneously received PUSCHs is NACK, the resulting bit is NACK.

There is a possibility that the number 'O' of code blocks (CBs) contained in a TB is smaller than M. In this condition, suppose one CBG is composed of one CB, there would be only O CBGs in the TB (O<M). As a result, only O out of M bits of the second part are used to indicate the erroneously received CBG(s) of the erroneously received TB(s). On the other hand, the remaining (M-O) bit(s) of the second part, preferably, the (M-O) LSB bit(s) or the (M-O) MSB bit(s) of the second part, may be reserved. Preferably, the remaining (M-O) bits may be padded with ACK.

In step 550, the gNB transmits the CBGTI field as a field of a second UL grant for scheduling retransmission.

If any bit of the first part of the CBGTI field is set to NACK, a retransmission is necessary. The UE checks the first part of the CBGTI field to learn which TB(s) need to be retransmitted and checks the second part of the CBGTI field to learn which CBG(s) of the retransmitted TB(s) need to be retransmitted. An example of the CBGTI field is as follows: the first part: "01111011" ('1' represents ACK and '0' represents NACK), and the second part: "10001111" ('1' represents ACK and '0' represents NACK). Consequently, the second, third and fourth CBGs of the first and sixth TBs need to be retransmitted.

In step 560, upon receiving the second UL grant, the UE determines whether retransmission is necessary. If the retransmission is necessary, the UE performs the retransmission according to the CBTTI field in a procedure similar to the step 530.

In the condition that all of the bits of the first part of the CBGTI field are set to ACK, all TBs are successfully received. The method 500 ends.

According to method 500, the CBGTI field occupies $N_{MAX}+M$ bits. On the other hand, the traditional CBG-based PUSCH retransmission would occupy $N_{MAX}*M$ bits. So, $N_{MAX}*M$ bits are compressed relative to $N_{MAX}+M$ bits. As described above, $N_{MAX}$ ranges from 2 to 8. M generally takes a value between 4 and 8. Therefore, $N_{MAX}+M$ is much smaller than $N_{MAX}*M$. This may save significant overhead, especially when $N_{MAX}$ takes a value of 8 and/or when M takes a value of 6 or 8.

According to statistics and requirement, the number of failed TBs (erroneously received TBs) among N TBs is relatively low. Approximately, the BLER for one TB is about 10%. As a result, in the condition that $N_{MAX}=8$, less than 1 TB (10%*8-0.8) would be erroneously received. That is to say, in most situations, K (the number of erroneously received TBs) is 1 or 0. When K=0, no retransmission needs to be performed. When K=1, the second part of the CBGTI field indicates exactly which CBG(s) of the erroneously received TB need to be retransmitted. When K>=2 (which rarely occurs), all of the erroneously received CBGs of the erroneously received TBs are indicated in the CBGTI field, although there might be some successfully received CBGs of the erroneously received TBs are also indicated. For example, in the above example, the CBGTI field indicates that the second, third and fourth CBGs of the first and sixth TBs need to be retransmitted. On the other hand, only the second and fourth CBGs of the first TB and the third and fourth CBGs of the sixth TB are erroneously received and are necessary to be retransmitted. However, although the third CBG of the first TB and the second CBG of the sixth TB are successfully received, they are indicated in the CBGTI field as being necessary to be retransmitted. This is a tradeoff for the compression of the $N_{MAX}*M$ bits to $N_{MAX}+M$ bits for the CBG-based PUSCH retransmission.

According to the embodiments shown in FIGS. 4 and 5, both the first part and the second part of the CBGTI field are fixed in length, i.e., fixed to $N_{MAX}$ bits and M bits, respectively. As a result, there would be no misunderstanding between UE and gNB on the CBGTI field length.

Figure 6:
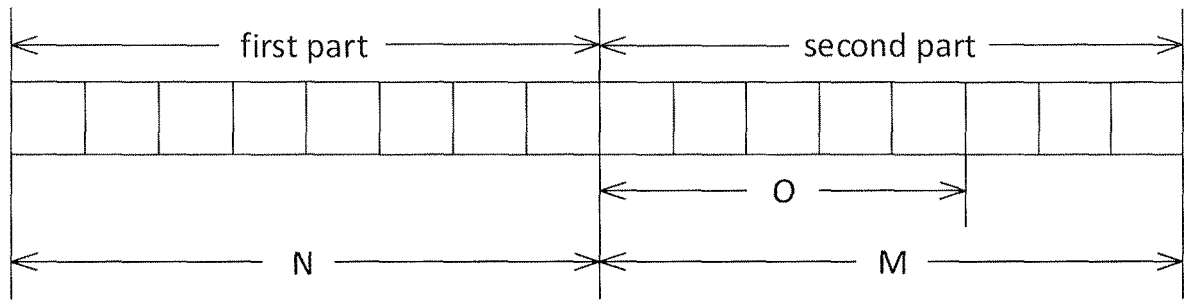
FIG. 6 is a schematic diagram illustrating one embodiment of HARQ-ACK codebook for the retransmission of PDSCHs.
Figure 7:
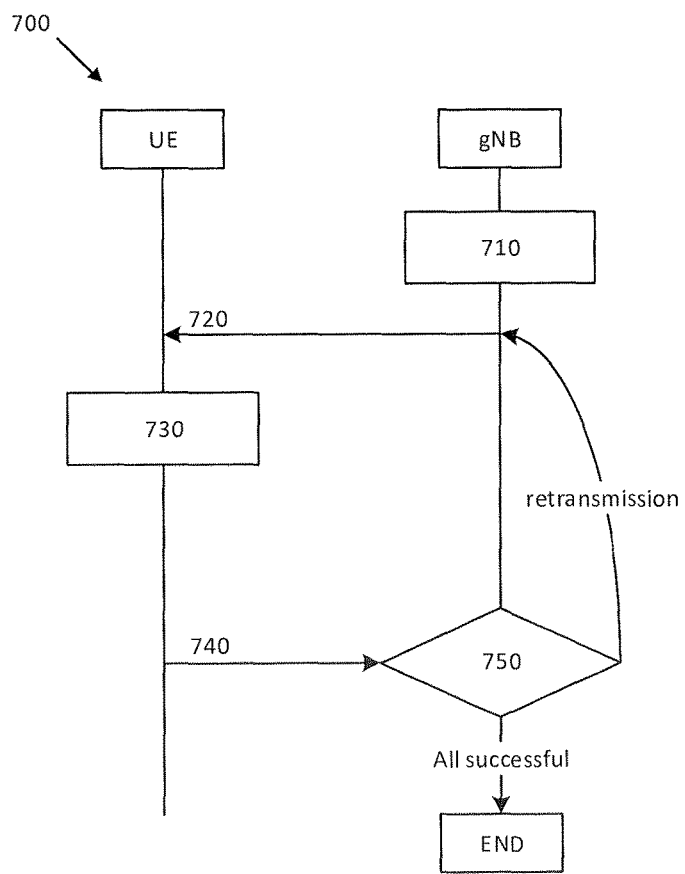
FIG. 7 is a schematic flow chart diagram illustrating an embodiment of a method for transmitting HARQ-ACK codebook.

The above disclosure describes the embodiment of the feedback for the multiple PUSCHs (UL transmissions) with reference to FIGS. 4 and 5. FIGS. 6 and 7 show the embodiment of the feedback for the multiple PDSCHs (DL transmissions).

FIG. 6 shows an example of HARQ-ACK codebook for the retransmission of PDSCHs.

As described in the background part, if N PDSCH occasions are determined in the downlink association set (DAS) (in other words, N indicates the number of PDSCHs with corresponding HARQ-ACK feedback in one HARQ-ACK codebook) and C carriers are configured and single-codeword configuration for DL transmission is assumed, then semi-static HARQ-ACK codebook size is C*N*M, where M is the RRC configured maximum number of CBGs of one TB. For easy description, hereinafter, we assume that a total of N PDSCHs are transmitted in one DAS, i.e., N TBs are transmitted in which each TB is composed of M CBGs. Consequently, the traditional HARQ-ACK codebook size for such transmission is N*M.

On the other hand, as shown in FIG. 6, the HARQ-ACK codebook size is N+M. In particular, the HARQ-ACK codebook is composed of two parts. The first part is a first HARQ-ACK sub-codebook consisting of TB-level HARQ-ACK feedback bits for all the N PDSCHs. Each bit in the first HARQ-ACK sub-codebook corresponds to one PDSCH, so the payload size (length) of the first HARQ-ACK sub-codebook is N. The second part is a second HARQ-ACK sub-codebook consisting of M CBG-level HARQ-ACK feedback bits, for the failed PDSCH(s). Each bit in the second HARQ-ACK sub-codebook is generated by performing a logic operation among CBG-level HARQ-ACK bits for CBGs with same CBG index across all the failed PDSCH(s). Assuming K is the number of failed PDSCH(s), 0<=K<=N, there are K NACK bit(s) included in the first HARQ-ACK sub-codebook.

At UE side, after reception of the initial transmission of the N PDSCHs, K PDSCHs are decoded as not being correctly received. Hence, the UE generates the HARQ-ACK codebook by appending the second HARQ-ACK sub-codebook to the end of the first HARQ-ACK sub-codebook.

FIG. 7 depicts a method (700) for transmitting HARQ-ACK codebook.

In step 710, the number 'N' of PDSCHs with corresponding HARQ-ACK feedback in one HARQ-ACK codebook and the maximum number 'M' of CBGs per TB are pre-configured using RRC signaling. The preferable range of N is 2 to 8. More preferably, the values of N may be 2, 4, 6 or 8.

In step 720, the gNB transmits N TBs on N PDSCHs, wherein each TB includes M CBGs. In the condition that the number 'O' of all of CBs that are necessary to be transmitted is smaller than M, each CB of the O CBs (O<M) would compose a CBG. Therefore, the TB would include 0 CBGs.

In step 730, the UE receives and decodes all of the N TBs transmitted from the gNB. The decoding result indicates whether each TB and each CBG of the TBs are successfully or erroneously received. In particular, a TB being successfully received (i.e. correctly decoded) means that all of the CBGs of the TB are successfully received. On the other hand, so long as at least one CBG of a TB is erroneously received (incorrectly decoded), the TB is erroneously received although other CBG(s) of the erroneously received TB may be successfully received.

The UE generates a HARQ-ACK codebook according to the decoding result. The HARQ-ACK codebook includes a first HARQ-ACK sub-codebook and a second HARQ-ACK sub-codebook.

As shown in FIG. 6, the first HARQ-ACK sub-codebook contains N bits. Each bit of the first HARQ-ACK sub-codebook indicates whether each of the N TBs is successfully or erroneously received.

As shown in FIG. 6, the second HARQ-ACK sub-codebook contains M bits. K represents the number of TBs that are erroneously received at the gNB, K may be 0, 1, 2, . . . N. Each bit in the second HARQ-ACK sub-codebook is generated by performing a logic operation on all of the corresponding CBGs of the K erroneously received PDSCH(s). The logic operation may be logic AND in the condition that '1' represents ACK and '0' represents NACK. Alternatively, the logic operation may be logic OR in the condition that '0' represents ACK and '1' represents NACK.

When K=0, N bits in the first HARQ-ACK sub-codebook consists of N ACK bits for the N PDSCHs, and M bits in the second HARQ-ACK sub-codebook are padded by M ACK bits or reserved to guarantee the same understanding between UE and gNB on the HARQ-ACK codebook.

When K=1, N bits in the first HARQ-ACK sub-codebook consists of (N−1) ACK bits and 1 NACK bit, and M bits in the second HARQ-ACK sub-codebook are M CBG-level HARQ-ACK bits with each bit corresponding to one CBG of the failed PDSCH.

When K=2 to N, N bits in the first HARQ-ACK sub-codebook consists of (N−K) ACK bits and K NACK bits, and M bits in the second HARQ-ACK sub-codebook are M CBG-level HARQ-ACK bits with each bit generated by performing a logic operation among CBG-level HARQ-ACK bits for CBGs with the same CBG index across all of failed PDSCHs so that as long as one corresponding bit of any of the K erroneously received PDSCHs is NACK, the resulting bit is NACK.

There is a possibility that the number 'O' of code blocks (CBs) contained in a TB is smaller than M. In this condition, suppose one CBG is composed of one CB, there would be only O CBGs in the TB (O<M). As a result, only O out M bits of the second part are used to indicate the erroneously received CBG(s) of the erroneously received TB(s). On the other hand, the remaining (M-O) bit(s) of the second part, preferably, the (M-O) LSB bit(s) or the (M-O) MSB bit(s) of the second part, may be reserved. Preferably, the remaining (M-O) bits may be padded with ACK.

In step 740, the UE transmits the HARQ-ACK codebook to the gNB for scheduling retransmission.

If any bit of the first HARQ-ACK sub-codebook is set to NACK, a retransmission is necessary. The gNB checks the first HARQ-ACK sub-codebook to learn which TB(s) need to be retransmitted and checks the second HARQ-ACK sub-codebook to learn which CBG(s) of the retransmitted TB(s) need to be retransmitted. An example of the HARQ-ACK codebook is as follows: the first HARQ-ACK sub-codebook: "01111011" ('1' represents ACK and '0' represents NACK), and the second HARQ-ACK sub-codebook: "10001111" ('1' represents ACK and '0' represents NACK). Consequently, the second, the third and fourth CBGs of the first and sixth TBs need to be retransmitted.

In step 750, upon receiving the HARQ-ACK codebook, the gNB determines whether retransmission is necessary. If the retransmission is necessary, the gNB performs the retransmission according to the HARQ-ACK codebook in a procedure similar to step 720.

In the condition that all of the bits of the first HARQ-ACK sub-codebook are set to ACKs, all of the TBs are successfully received and method 700 ends.

According to method 700, the HARQ-ACK codebook occupies N+M bits, which are compressed in comparison with the traditional CBG-based PDSCH retransmission that would occupy N*M bits.

The same advantage for the DL retransmissions may be obtained as that found in the UL retransmissions.

As a whole, the CBGTI field in UL grant for CBG-based PUSCH retransmission and HARQ-ACK codebook for CBG-based PDSCH retransmission are compressed compared to the uncompressed case, i.e., $N_{MAX}$*M bits for the CBGTI field are compressed to $N_{MAX}$+M bits and N*M bits in HARQ-ACK codebook are compressed to N+M bits. Moreover, both UE and gNB synchronize their knowledge on the HARQ-ACK codebook.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
receive a first number of transport blocks, wherein each transport block of the first number of transport blocks includes a second number of code block groups;
decode the first number of transport blocks; and
transmit a signaling comprising a first field corresponding to the first number of transport blocks and a second field corresponding to the second number of code block groups included in a third number of transport blocks, wherein the third number of transport blocks are incorrectly decoded transport blocks in the first number of transport blocks, and wherein the first field includes a first number of new data indicator bits, and each new data indicator bit corresponds to one of the first number of transport blocks.

2. The UE of claim 1, wherein the first field includes a first number of bits indicating decoding results of the first number of transport blocks, and
a decoding result corresponding to a transport block is an ACKNOWLEDGEMENT in response to the transport block being correctly decoded or a NEGTIVE ACKNOWLEDGEMENT in response to the transport block being incorrectly decoded.

3. The UE of claim 1, wherein the second field includes a second number of bits indicating decoding results of the code block groups included in the third number of transport blocks, and
a decoding result corresponding to a code block group is an ACKNOWLEDGEMENT in response to all of code blocks of the code block group being correctly decoded or a NEGTIVE ACKNOWLEDGEMENT in response to at least one code block of the code block group being incorrectly decoded.

4. The UE of claim 1, wherein the second field includes a second number of bits, and
each bit corresponds to a set of code block groups with same code block group index included in the third number of transport blocks, for indicating ACKNOWLEDGEMENT in response to the set of code block groups being correctly decoded or NEGTIVE ACKNOWLEDGEMENT in response to at least one code block group of the set of code block groups being incorrectly decoded.

5. The UE of claim 1, wherein a first number of transport blocks is scheduled by a single downlink control information format, and
the first number is indicated by the downlink control information format.

6. The UE of claim 1, wherein the maximum number of transport blocks scheduled by a single downlink control information format is configured by radio resource control signaling.

7. The UE of claim 6, wherein the downlink control information format includes a third field indicating the first number, and
a length of the third field is determined based on a configured maximum number of transport blocks scheduled by a single downlink control information format.

8. The UE of claim 1, wherein the first field includes a first number of bits, and each bit indicates whether one of the first number of transport blocks is to be retransmitted.

9. The UE of claim 1, wherein a length of the first field equals to a maximum number of transport blocks scheduled by a single downlink control information format.

10. The UE of claim 1, wherein the second field includes a second number of bits, and
each bit corresponds to a set of code block groups with same code block group index included in the third number of transport blocks for indicating whether the set of code block groups is to be retransmitted.

11. The UE of claim 1, wherein the second number is configured by radio resource control signaling.

12. A method performed by a user equipment (UE), the method comprising:
receiving a first number of transport blocks wherein each transport block of the first number of transport blocks includes a second number of code block groups;
decoding the first number of transport blocks; and
transmitting a signaling comprising a first field corresponding to the first number of transport blocks and a second field corresponding to the second number of code block groups included in a third number of transport blocks, wherein the third number of transport blocks are incorrectly decoded transport blocks in the first number of transport blocks, and wherein the first field includes a first number of new data indicator bits, and each new data indicator bit corresponds to one of the first number of transport blocks.

13. The method of claim 12, wherein the first field includes a first number of bits indicating decoding results of the first number of transport blocks, and
a decoding result corresponding to a transport block is an ACKNOWLEDGEMENT in response to the transport block being correctly decoded or a NEGTIVE ACKNOWLEDGEMENT in response to the transport block being incorrectly decoded.

14. The method of claim 12, wherein the second field includes a second number of bits indicating decoding results of the code block groups included in the third number of transport blocks, and
a decoding result corresponding to a code block group is an ACKNOWLEDGEMENT in response to all of code blocks of the code block group being correctly decoded or a NEGTIVE ACKNOWLEDGEMENT in response to at least one code block of the code block group being incorrectly decoded.

15. The method of claim 12, wherein the second field includes a second number of bits, and
   each bit corresponds to a set of code block groups with same code block group index included in the third number of transport blocks, for indicating ACKNOWLEDGEMENT in response to the set of code block groups being correctly decoded or NEGTIVE ACKNOWLEDGEMENT in response to at least one code block group of the set of code block groups being incorrectly decoded.

16. The method of claim 12, wherein the first number of transport blocks is scheduled by a single downlink control information format, and
   the first number is indicated by the downlink control information format.

17. The method of claim 12, wherein the maximum number of transport blocks scheduled by a single downlink control information format is configured by radio resource control signaling.

18. The method of claim 17, wherein the downlink control information format includes a third field indicating the first number, and
   a length of the third field is determined based on a configured maximum number of transport blocks scheduled by a single downlink control information format.

19. The method of claim 12, wherein the second field includes a second number of bits, and
   each bit corresponds to a set of code block groups with same code block group index included in the third number of transport blocks for indicating whether the set of code block groups is to be retransmitted.

* * * * *